M. RALL.
SHAFT COUPLING.
APPLICATION FILED MAR. 8, 1912.
1,117,704. Patented Nov. 17, 1914.
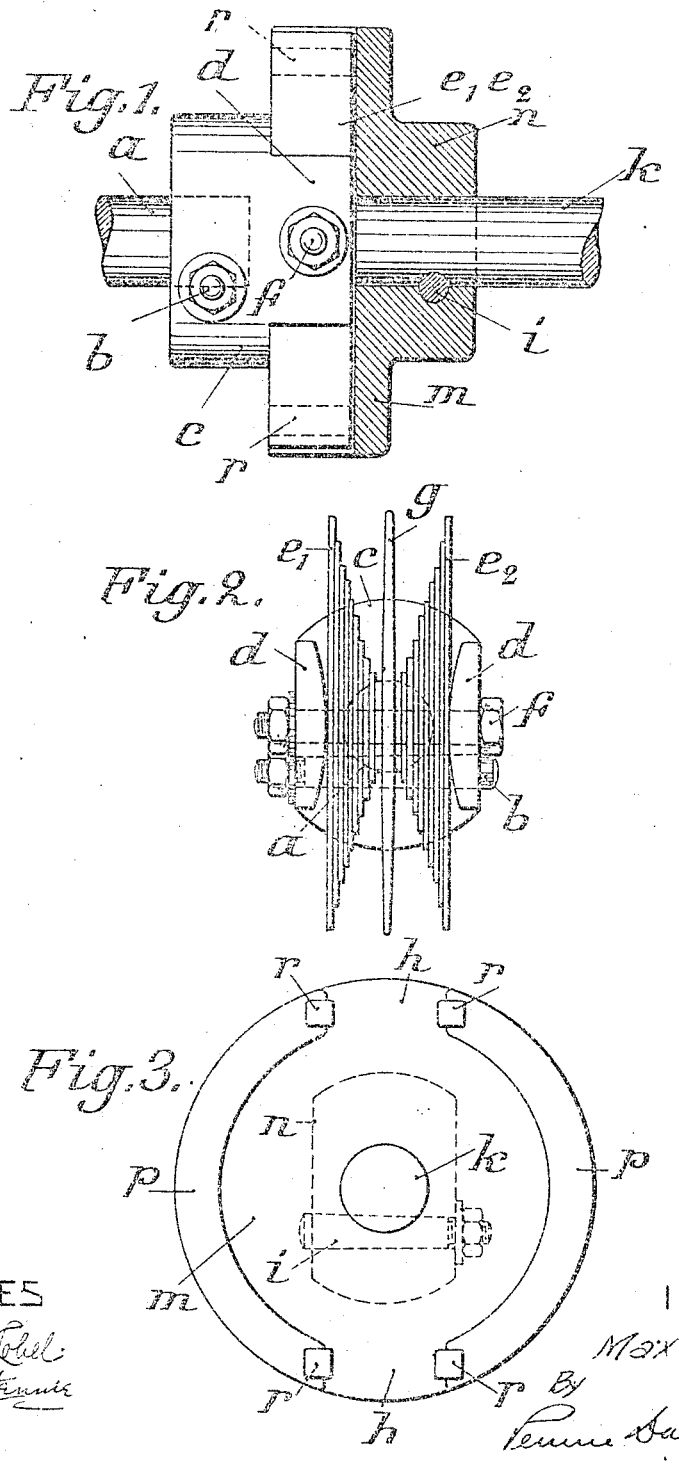

UNITED STATES PATENT OFFICE.

MAX RALL, OF PARIS, FRANCE, ASSIGNOR TO THE FIRM OF ROBERT BOSCH, OF STUTTGART, GERMANY.

SHAFT-COUPLING.

1,117,704.  Specification of Letters Patent.  Patented Nov. 17, 1914.

Application filed March 8, 1912.  Serial No. 682,409.

*To all whom it may concern:*

Be it known that I, MAX RALL, engineer, a subject of the German Emperor, residing at 55 Rue Lafontaine, Paris, France, have invented certain new and useful Improvements in Shaft-Couplings; and I do hereby declare the following to be a full, clear, and exact description of the invention, such as will enable others skilled in the art to which it appertains to make and use the same.

The present invention relates to shaft couplings and more particularly to a spring coupling well adapted to axially abutting shafts for driving an electric ignition machine from the internal combustion engine associated with it.

In driving electric ignition machines of ordinary construction, the driving force fluctuates greatly as the rotating pole pieces sweep by the stationary magnets. Furthermore in the operation of internal combustion engines, abrupt changes in speed occur continually as a result of the rapid variation of instantaneous power produced during each cycle of the engine. The fluctuation of the driving force due to either or both of these causes is of such magnitude that the coupling parts may reverse their driving and driven functions several times in each rotation, the normal driving member actually being driven by the normally driven member during some parts of the cycle.

In order to partially equalize the fluctuating character of the driving force, and for other well known reasons, a spring coupling has heretofore been interposed between the driving and driven shafts, but in most forms of such construction of which I am aware, the coupling has been constructed in such manner that the springs employed were flexed first in one direction and then in the other direction as a result of this reversal of driving and driven function of the coupling parts. In consequence of continued repetition of this action, the spring element of such a coupling became brittle and unserviceable in practice after a comparatively short period of operation.

In one form of construction intended to avoid the rapid destruction of the springs due to these causes, two magazines of leaf springs engage coöperating abutments interposed between the two magazines, so that parts of the springs were flexed in one direction only.

The present invention is also directed to a construction for avoiding the rapid destruction of the springs due to these causes. It accomplishes that purpose by employing in the coupling a spring structure, preferably two magazines of leaf springs, adapted to engage coöperating abutments arranged outside the springs in such manner that the springs are flexed inwardly only, whether the driving and driven functions are reversed or not, and whatever the direction of rotation of the engine. In this way one part of the springs of a magazine is flexed inwardly when the coupling parts become angularly displaced in one direction, while the other part of the springs is flexed inwardly when the coupling parts become angularly displaced in the reverse direction, as a result of which no one part of any spring is ever flexed in both directions.

The invention also contemplates as a further advantageous feature a spring abutment intermediate of the spring magazines and coöperative therewith after a predetermined angular displacement of the coupling parts to impose an additional resistance to further angular displacement in the same direction.

In the accompanying drawing illustrating the preferred embodiment of my invention, Figure 1 is a side elevation, partly in section, of the complete coupling; Fig. 2 is an end view of one coupling part; and Fig. 3 is an end view of the other coupling part.

Upon the end of one, $a$, of the axially abutting shafts, for example the shaft of a magneto electric machine, is fixed by means of the key $b$, the coupling part $c$ provided with lugs $d$. Between these lugs are mounted two magazines of springs $e_1$ and $e_2$, each preferably comprising a plurality of flat metal springs gradually increasing in length from the inside to the outside ones, so that a space of increasing extent is left between the two magazines toward the outer ends thereof. One or more spring abutments, such as the flexible plate $g$, may be placed between the two magazines for the purpose of imposing an additional resistance to the movement of the main springs, the arrangement being such that the ends of the spring $e_1$ or $e_2$ abuts against the spring plate $g$ when flexed to a predetermined inward position. The two magazines $e_1$ $e_2$ with their intermediate stop $g$ are diametrically fastened to the coupling part $c$ by means of the bolt $f$ passing through the lugs $d$ and the spring structure. The other coupling part consists of a disk $m$ having a hub $n$ fixed to the other one $k$ of the axially abutting shafts, for example the driving shaft actuated by the internal combustion engine. This disk is provided with peripheral flanges $p$ having radially cut-away portions $h$ for the reception of the spring magazines $e_1$, $e_2$ of the other coupling part. The abutments $r$ are preferably made of renewable wearing material, such as blocks of fiber and the like, and they are diametrically disposed on the coupling part $m$ so as to coöperate with the spring magazines on the outside of the ends thereof in such manner that when the two coupling parts become angularly displaced in one direction the opposite ends of the two magazines are flexed inwardly, and when the coupling parts become angularly displaced in the other direction the other two opposite ends of the spring magazines are flexed inwardly. By this arrangement, the two coupling parts may have their driving and driven functions reversed or the direction of rotation of the engine may be reversed, without altering the direction of flexure of any given part of any of the springs. Upon angular displacement of the coupling parts in one direction, the coöperating abutments $r$ flex the opposite ends of the two magazines, while the other ends of those springs are not flexed at all at that time. However, when the angular displacement of the coupling parts is reversed, the other opposite ends of the spring magazines are flexed, while those ends which were flexed before are now not flexed at all. It will be obvious, therefore, that no part of any spring is ever flexed in both directions, inasmuch as certain parts of the springs resist angular displacement of the coupling part in one direction, while the other parts of the springs resist angular displacement of the coupling parts in the other direction.

Having thus described my invention what I claim is:

1. A flexible coupling for abutting shafts comprising a coupling part fastened to each shaft, two diametrically-disposed flat springs of metal separated from each other and fastened intermediate of their ends to one coupling part, and coöperative abutments carried by the other coupling part on the outside of said springs to flex one spring inwardly independently of the second spring upon angular displacement of the coupling parts in one direction, and to flex the second spring inwardly independently of the first spring upon angular displacement of the coupling parts in the reverse direction, whereby reverse flexure is avoided in both springs when the coupling parts interchange their driving and driven functions, the arrangement being such that the springs are free to flex in the direction of the displacement of the coupling parts; substantially as described.

2. A flexible coupling for abutting shafts comprising a coupling part fastened to each shaft, two diametrically-disposed flat springs of metal separated from each other and fastened intermediate of their ends to one coupling part, and diametrically-disposed coöperative abutments carried by the other coupling part on the outside of said springs to effect driving engagement with the opposite ends of the two springs upon angular displacement of the coupling parts in one direction and with the other opposite ends of the two springs upon angular displacement of the coupling parts in the reverse direction, whereby reverse flexure is avoided in both springs when the coupling parts interchange their driving and driven functions; substantially as described.

3. A spring coupling for abutting shafts comprising a coupling part fastened to each shaft, a spring structure fastened to one coupling part, coöperative engaging means carried by the other coupling part to effect driving engagement with the spring structure, and a spring abutment carried on the coupling part which carries the spring structure and coöperative therewith after a predetermined angular displacement of the coupling parts in either direction to impose an additional resistance to increased angular displacement; substantially as described.

4. A spring coupling for abutting shafts comprising a coupling part fastened to each shaft, two diametrically-disposed springs separated from each other and fastened to one coupling part, coöperative abutments on the other coupling part arranged to flex said springs upon angular displacement of the coupling parts, and a spring abutment carried intermediate of said springs by the coupling part to which they are fastened to impose an additional resistance to angular displacement greater than a predetermined amount; substantially as described.

5. A spring coupling for abutting shafts comprising a coupling part fastened to each shaft, two diametrically-disposed springs separate from each other and fastened intermediate of their ends to one coupling part, coöperative abutments on the other coupling part arranged to flex said springs inwardly upon angular displacement of the coupling parts, and a diametrically-disposed flexible plate fastened intermediate of said springs to the coupling part to which they are fastened to impose an additional resistance after a predetermined angular displacement of the coupling parts; substantially as described.

6. A spring coupling for abutting shafts comprising a coupling part fastened to each shaft, two diametrically-disposed spring magazines fastened intermediate of their ends to one coupling part and comprising a plurality of springs gradually increasing in length from the inside to the outside ones, coöperative abutments on the other coupling part arranged to flex said magazines inwardly upon angular displacement of the coupling parts, and a flexible plate carried intermediate of the two magazines by the coupling part to which they are fastened for imposing an additional resistance after a predetermined angular displacement of the coupling parts; substantially as described.

7. In a spring coupling for abutting shafts, a coupling part fastened to each shaft, a spring transmitting structure for transmitting torque between the coupling parts, and a spring abutment which is normally inactive but which is coöperative with the spring structure after a predetermined angular displacement of the coupling parts in either direction to impose an additional resistance to increased angular displacement thereof; substantially as described.

In testimony whereof I affix my signature, in presence of two witnesses.

MAX RALL.

Witnesses:
  FIZAINE,
  EUG. LEVI.